US007891003B2

(12) United States Patent
Mir et al.

(10) Patent No.: US 7,891,003 B2
(45) Date of Patent: Feb. 15, 2011

(54) ENTERPRISE THREAT MODELING

(75) Inventors: Talhah M. Mir, Redmond, WA (US);
Anil Kumar Revuru, Bellevue, WA (US); Shawn G. Veney, Puyallup, WA (US)

(73) Assignee: Microsoft Corporation, Redmond, WA (US)

( * ) Notice: Subject to any disclaimer, the term of this patent is extended or adjusted under 35 U.S.C. 154(b) by 1127 days.

(21) Appl. No.: 11/424,122

(22) Filed: Jun. 14, 2006

(65) Prior Publication Data

US 2007/0294766 A1 Dec. 20, 2007

(51) Int. Cl.
*G06F 21/00* (2006.01)

(52) U.S. Cl. ........................................ 726/25

(58) Field of Classification Search ............ 726/22, 726/23, 24, 25, 26
See application file for complete search history.

(56) References Cited

U.S. PATENT DOCUMENTS

| 6,014,666 | A | 1/2000 | Helland et al. | |
|---|---|---|---|---|
| 6,983,221 | B2 | 1/2006 | Tracy et al. | |
| 2002/0188861 | A1 | 12/2002 | Townsend | |
| 2003/0033516 | A1 | 2/2003 | Howard et al. | |
| 2003/0233575 | A1 | 12/2003 | Syrjanen et al. | |
| 2004/0010709 | A1 | 1/2004 | Baudoin et al. | |
| 2005/0044418 | A1* | 2/2005 | Miliefsky | 713/201 |
| 2005/0273854 | A1 | 12/2005 | Chess et al. | |
| 2006/0015943 | A1 | 1/2006 | Mahieu | |
| 2006/0021002 | A1 | 1/2006 | Townsend et al. | |
| 2006/0085852 | A1* | 4/2006 | Sima | 726/22 |
| 2006/0156408 | A1* | 7/2006 | Himberger et al. | 726/25 |

FOREIGN PATENT DOCUMENTS

GB 2 407 672 A 5/2005

OTHER PUBLICATIONS

Olzak, Tom, "A Practical Approach to Threat Modeling", www.infosecwriters.com, Text Library, Mar. 2006, http://www.infosecwriters.com/text_resources/pdf/Threat_Modeling_TOlzak.pdf.
Microsoft Corporation, "Threat Modeling Tool", www.rnicrosoft.com, Download Center, ThreatModelTool. msi, 2004, http://www.microsoft.com/downloads/details.aspx?familyid=62830f95-0e61-4f87-88a6-e7c663444ac1&displaylang=en.
Odubiyi et al., Bowie State University, Community College of Baltimore County, "Information Security Attack Tree Modeling", http://cisr.nps.navy.mil/downloads/wecs7_ch3.pdf.
Myagmar et al., National Center for Supercomputing Applications (NCSA), University of Illinois at Urbana-Champaign, "Threat Modeling as a Basis for Security Requirements", www.projects.ncassr.org, SIFT Research Project Papers, 2005, http://www.projects.ncassr.org/sift/papers/sreis05.pdf.

* cited by examiner

*Primary Examiner*—Ellen Tran
(74) *Attorney, Agent, or Firm*—Vierra Magen Marcus & DeNiro LLP

(57) ABSTRACT

A threat modeling application generates threats to a business application. The threat modeling application receives user input associated with business application data. The input may be received through an interface provided by the threat modeling application. Threats are automatically generated from the received data and an attack library. The attack library includes information regarding attacks and related countermeasures. By automatically generating threats based on business application information, the threat modeling application can generate security threats consistently and objectively.

20 Claims, 10 Drawing Sheets

Figure 8A

|  | Create | Read | Update | Delete | Condition |
|---|---|---|---|---|---|
| Users | X | | | | |
| Users | | X | X | | User is owner of credit card record |
| Admins | X | X | X | X | |

Figure 8B

| Consumer | Action | Provider | Data Sent | Data Recd |
|---|---|---|---|---|
| Call 1 | | | | |
| Users | Create CC info | Website | CC information | |
| Call 2 | | | | |
| Admins | Create CC info | Website | CC information | |
| Call 3 | | | | |
| Website | Save CC info | Database | CC information | |

Figure 8C

|  | Users | Admins | WebsiteRole |
|---|---|---|---|
| Website | Create CC info | Create CC info | |
| Database | | | Save CC info |

ENTERPRISE THREAT MODELING

BACKGROUND

As e-commerce becomes more mainstream and an important part of business operations, e-commerce security has become more important. Determining threats and weaknesses to a web service or other application-based system is important to a business that provides the service. By analyzing and dealing with potential threats, system designers may help prevent attacks against a web service and other service failures. Mitigating service threats provides for a more secure and safe environment in which business customers may conduct business.

Typically, threat modeling involves a team of designers that "brainstorm" to identify perceived vulnerabilities and other weaknesses of a system. Though this method may catch several vulnerabilities of a system, it is suspect to human error and does not provide a standard methodology for eliminating system threats.

Some threat modeling methods have been implemented to identify system threats. However, most modeling methods have had inconsistent success. In particular, some threat modeling systems produce an attack model rather than an actual threat model. Other systems are too general, and often use a threat model of a physical process or a general implementation of a software application. This generalization can affect modeling usability because of a lack of focus from the consumer's perspective.

SUMMARY

The present technology, roughly described, provides a threat modeling system for generating threats to a system. The system is used to define a business application, model the defined application and measure application threats. By performing these steps, the threat modeling system consistently and objectively generate threats for an enterprise system.

The modeling system receives user input regarding application requirements and application architecture. The system then automatically generates threats based on the received information. In some cases, the threat modeling system can translate technical risks to business impact. This enables users not having an expert level of security knowledge to effectively generate a threat model for their system. The modeling system provides a user interface for configuring and viewing the threat model, and can access an attack library to develop a business application threat model.

In some embodiments, the threat modeling system operates to receive application data, automatically generate threat information in response to the application data, and provide countermeasures associated with the generated threat information. The application data may be associated with one or more application components and one or more application calls. The threat information may be derived from the application data and an attack library. In some embodiments, the application data is compared to the attack library.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

BRIEF DESCRIPTION OF THE DRAWINGS

FIG. 8A is an example of a data access control list.
FIG. 8B is an example of a call list.
FIG. 8C is an example of a subject object matrix.

DETAILED DESCRIPTION

Figure 1:
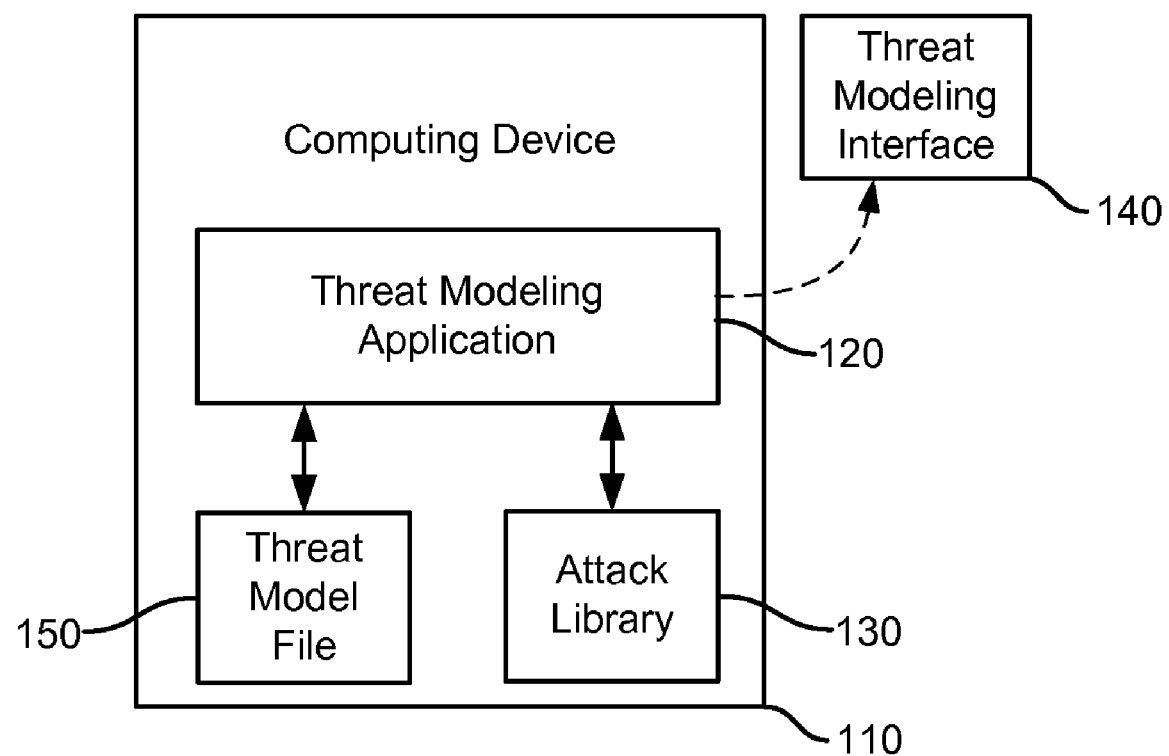
FIG. 1 is a block diagram of a computing device.

A threat modeling application generates threats to a business application or other application-based system. The threat modeling application may be applied to typical enterprise IT applications and other applications. The threat modeling application receives user input associated with business application requirements and business application architecture. The threat modeling application then automatically generates threats based on the received business application input. In some cases, the threat modeling application can translate technical risks to business impact. This enables users not having an expert level of security knowledge to effectively generate a threat model for their system. By automatically generating threats based on business application information, the threat modeling application can generate security threats consistently and objectively.

In some embodiments, the threat modeling application receives business application data, automatically generates threat information from the application data, and provides countermeasures associated with the generated threat information. The business application data may be associated with one or more business application components and one or more business application calls. The generated threat information may be derived from the business application data and an attack library. In some embodiments, the business application data is compared to the attack library to generate the threat information.

In one embodiment, non-security specific information is used to produce critical security artifacts such as data access control matrix, component access control matrix, call flow, data flow, trust flow, identify trust boundaries, identify attack surfaces. This is discussed in more detail below.

As discussed herein, a threat is an undesired event that will have a negative impact on one or more specified business objectives of a system. Examples of a threat include infiltration of a web service by someone not properly granted access and degradation in service provided by a web site. A threat model is a definition of a software application context which can be analyzed and re-engineered from multiple perspectives. Generation of a threat model enables an informed creation of security requirements or strategies.

Generating a threat model may include generating countermeasures to threats. A countermeasure addresses a vulnerability to reduce the probability of attacks or the impacts of threats. Examples of countermeasures include improving application design, improving code and improving an operational practice. A vulnerability is a weakness in some aspect or feature of a system that makes an attack possible. An attack is an action taken that utilizes one or more vulnerabilities to realize a threat. The relationship between attacks, vulnerabilities and countermeasures is discussed in more detail below with respect to FIG. 9.

The threat modeling application may be used with an attack library. An attack library is a collection of attack types. An attack type is a type of attack that may be experienced by the system for which a threat model is being generated. The attack library may also include relevancy data, attack vulnerability data and proposed countermeasures for vulnerabilities. In one embodiment, the attack library can be extended by a user. For example, a user can capture their own specific attacks, vulnerability, countermeasures and relevancies used to ensure consistency across their enterprise while building security strategy through the threat models discussed herein.

A relevancy is an attribute of a component which can give rise to the potential materialization of a defined attack. As system architecture components are defined by a user, the user may select one or more relevancies to associate with the component. The relevancy pool from which a user may select from can be generated from the attack library relevancies. After the system is defined and a threat model is generated, attacks that are associated with the user selected relevancies are generated. Each attack in the attack library may include relevancy data. The user may then analyze the attacks and corresponding countermeasures suggested by the system. This is discussed in more detail below.

Generating a threat model for a business application is discussed below with respect to FIGS. 1-10. In one embodiment, generating the threat model includes defining business application requirements and business application architecture, modeling threats for the defined business application, measuring the risk for the application and validating the threat model. Definition of the business application requirements and architecture includes defining calls from business application roles and components. From the calls, a subject object matrix is generated. The subject-object matrix can provide an authorization model for the business application. Threats are generated from each entry in the subject-object matrix. In one embodiment, a confidentiality, integrity and availability threat is generated for each matrix entry. This is discussed in more detail below.

In some embodiments, the methods and processes discussed below may be used to model threats using a threat modeling application. It is understood that other tools may be used to carry out the processes of the present processes as well, including spreadsheet applications or even paper and pencil. Although the technology is discussed below with reference to a threat modeling application, it is not intended to limit application of the concept of the threat modeling process to a particular type of application or working medium.

FIG. 1 is a block diagram of computing device 110. Computing device 110 includes threat modeling application 120, attack library 130 and threat model file 150. Threat modeling application 120 allows a user to model a business application. After the business application is modeled, threat modeling application 120 automatically generates system threats and other information.

Threat modeling application 120 may provide threat modeling interface 140. Interface 140 allows a user to enter business application information and view generated threats. Threat modeling interface 140 is discussed in more detail below with respect to FIG. 10.

Threat modeling application 120 is in communication with attack library 130. The attack library includes application attack data, vulnerability data, countermeasure data, relevancy data and relationships between attacks, core countermeasures, vulnerabilities and countermeasures. Threat modeling application 120 derives a threat model for a business application in part from the data of attack library 130. Deriving a threat model from an attack library is discussed in more detail below.

In generating a threat model, threat modeling application 120 may generate and/or save a threat model file 150. Threat model file 150 has a hierarchical data structure in which the threat model data is organized. The threat model data contained in file 150 includes the information received by a user and from which the threat model is generated (i.e., A "Threat Model" file contains a "Business Objectives", "Application Decomposition", "Application Use Cases", "Threats" and "Attack Library" section, A "Threat" contains a "Confidentiality", "Integrity" and "Availability" section, etc., discussed in more detail below). The threat model information is persisted in an open document format to address the extensibility of the threat model (e.g., allow users to import certain artifacts from other applications and export data to other toolsets). In one embodiment, the file is saved as an XML document. The format of the file can be modeled after the model data view in threat model interface 140. In this case, when the threat model is saved to threat model file 150, the provided data structure is saved in XML format.

Figure 2:
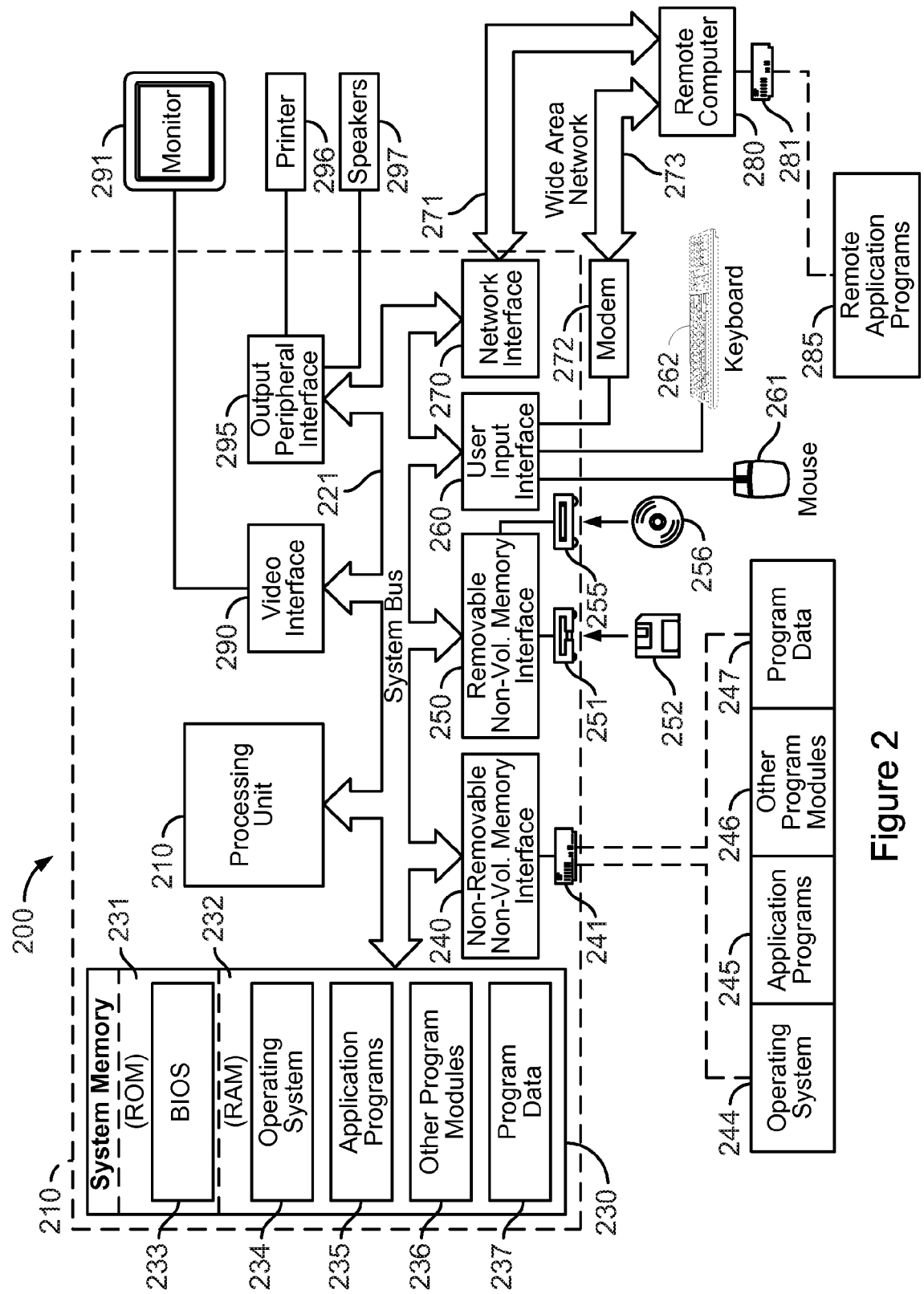
FIG. 2 is a block diagram of a computing environment for implementing the present technology.

FIG. 2 illustrates an example of a suitable computing system environment 200 on which the present technology may be implemented. The computing system environment 200 is only one example of a suitable computing environment and is not intended to suggest any limitation as to the scope of use or functionality of the technology. Neither should the computing environment 200 be interpreted as having any dependency or requirement relating to any one or combination of components illustrated in the exemplary operating environment 200. In one embodiment, computing environment 200 of FIG. 2 may be used to implement computing device 110 of FIG. 1.

The technology is operational with numerous other general purpose or special purpose computing system environments or configurations. Examples of well known computing systems, environments, and/or configurations that may be suitable for use with the technology include, but are not limited to, personal computers, server computers, hand-held or laptop devices, cell phones, smart phones, multiprocessor systems, microprocessor-based systems, set top boxes, programmable consumer electronics, network PCs, minicomputers, mainframe computers, distributed computing environments that include any of the above systems or devices, and the like.

The technology may be described in the general context of computer-executable instructions, such as program modules, being executed by a computer. Generally, program modules include routines, programs, objects, components, data structures, etc. that perform particular tasks or implement particular abstract data types. The technology may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the technology includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD ROM, digital versatile disks (DVD) or other optical disk storage, magnetic cassettes, magnetic tape, magnetic disk storage or other magnetic storage devices, or any other medium which can be used to store the desired information and which can accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 240 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 20 through input devices such as a keyboard 262 and pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 290.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

Figure 3:
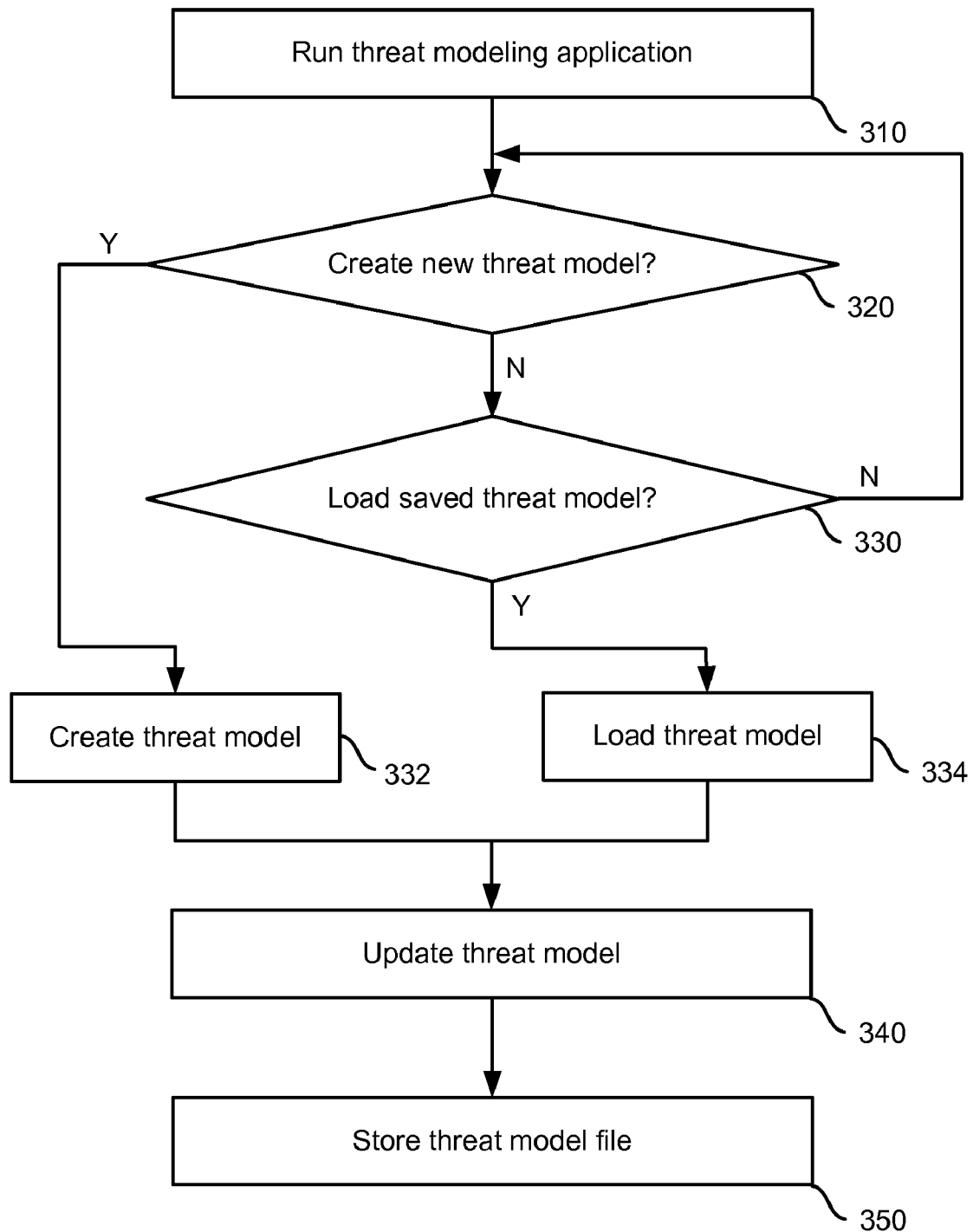
FIG. 3 is a flowchart of an embodiment of a process for generating a threat model.

FIG. 3 is a flowchart of an embodiment of a process for generating a threat model using a threat modeling application. In one embodiment, the flowchart of FIG. 3 is implemented by threat modeling application 120 of FIG. 1. The flowchart of FIG. 3 begins with running threat modeling application 120. Next, a determination is made as to whether a new threat model should be created at step 320. In one embodiment, threat modeling application 120 may receive input through threat modeling interface 140 indicating whether to create a new threat model or load a saved threat model file. If input is received to create a new threat model, the flowchart of FIG. 3 proceeds to step 332 where the new threat model is created. Creation of a new threat model may include generation of a threat model template and loading of the template into threat modeling interface 140. The method of FIG. 3 then proceeds to step 340. If no input is received to create a new threat model, a determination is made by threat modeling application 120 as to whether an existing threat model should be loaded at step 330. If an existing threat model should not be loaded, the method of FIG. 3 returns to step 320. If a saved threat model should be loaded, the saved threat model file is loaded and threat model data from the loaded file is loaded into threat modeling interface 140 at step 334. After loading the saved threat model, the method continues to step 340.

A threat model is updated at step 340. Updating may include receiving input regarding business application requirements and business application architecture. After business application requirements and architecture have been received, threat modeling application 120 may generate threat information from the received business application data. This is discussed in more detail below with respect to FIG. 4. After modifying the threat model, the threat model may be stored as a threat model file at step 350. The threat model file may be stored locally or on a remote storage device. A threat model file may be a text file or some other file type which includes business application and threat data in XML format. In some embodiments, the threat model file may be saved at any point during the creation or update of the threat model file during step 340.

Figure 4:
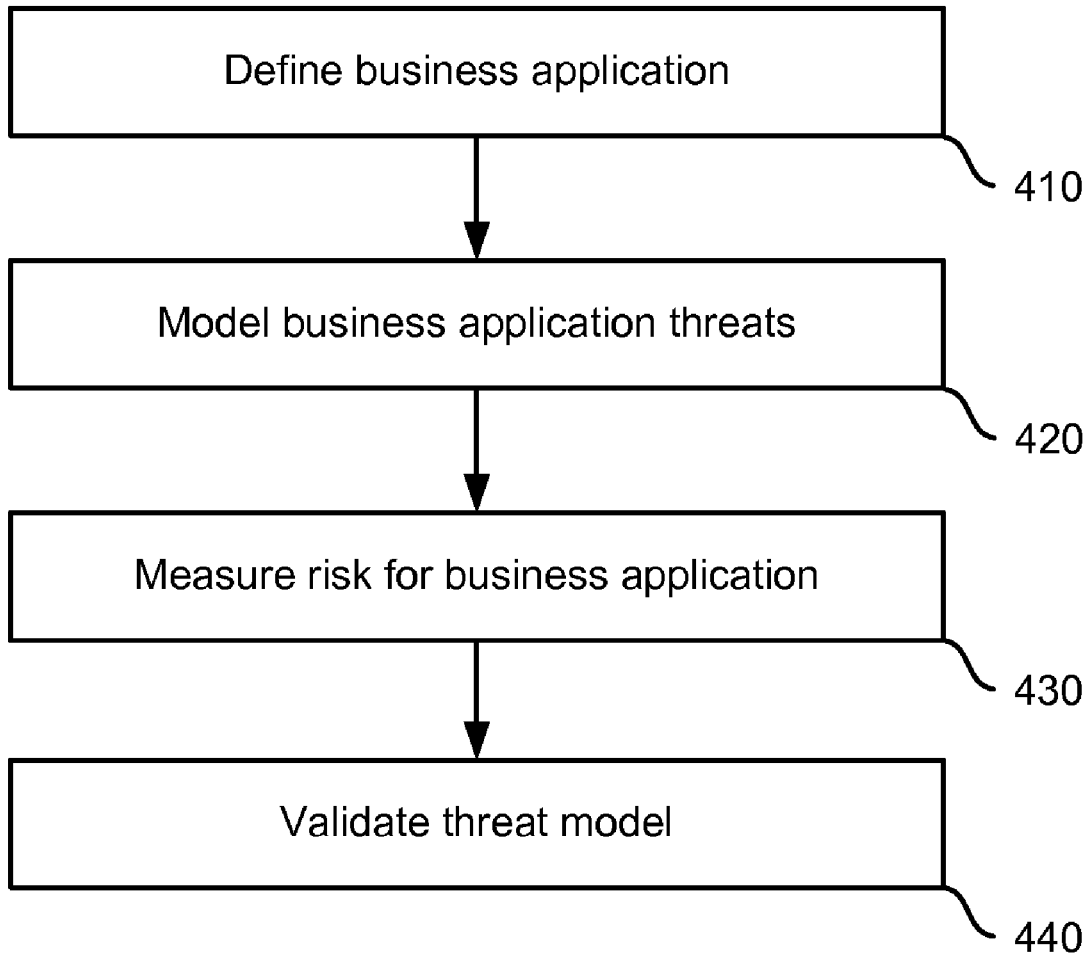
FIG. 4 is a flowchart of an embodiment of a process for generating a threat model.

FIG. 4 is a flowchart of an embodiment of a process for updating a threat model. In one embodiment, the flowchart of FIG. 4 provides more detail of step 340 of FIG. 3. Steps 410-440 of the flowchart of FIG. 4 are performed by a user providing input into threat modeling interface 140 provided by threat modeling application 120. Threat modeling application 120 facilitates information organization and assimilation of the received user input.

The flowchart of FIG. 4 begins with defining a business application at step 410. Defining a business application may include several steps. First, a user may define business application requirements through threat modeling interface 140. Business application requirements may include business objectives, application user roles, application data and application use cases. After defining these requirements, a user may define the business application architecture. Business application architecture may include application components, external dependencies, service roles, and application calls used to implement application use cases. Defining a business application in step 410 is discussed in more detail below with respect to FIG. 5. After defining a business application, the application threats are modeled at step 420. In one embodiment, modeling a business application includes generating threats from the defined business application. In some embodiments, the threats may be modeled and/or generated automatically. Modeling a business application is discussed in more detail below with respect to FIG. 6.

Risk to the business application is measured at step 430. In particular, the business application may be measured to quantify the risk of the threats identified. In this case, a user may measure or quantify the threats generated at step 420. Measuring risk for a business application is discussed in more detail with respect to FIG. 7A. After measuring the risk for a business application, the threat model may be validated at step 440. Validating the business application threat model may include confirming countermeasures are up-to-date, allowing a user to optimize the threat model and other actions.

Figure 5:
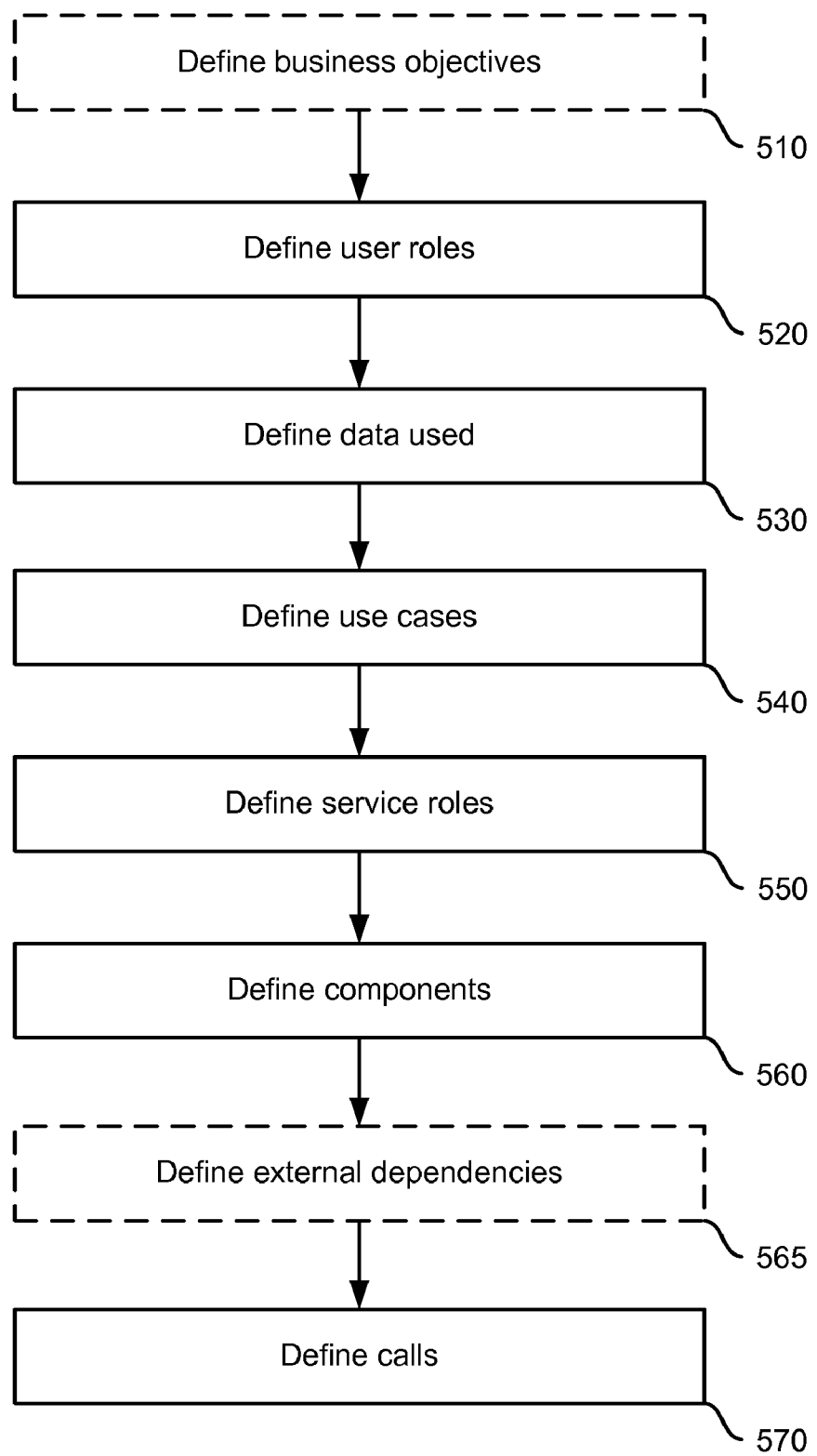
FIG. 5 is a flowchart of an embodiment of a process for defining and application.

FIG. 5 is a flowchart of an embodiment of a process for defining a business application. In one embodiment, the flowchart of FIG. 5 provides more detail for step 410 of FIG. 4. The process of FIG. 5 may be divided into two categories. Steps 510-540 may be associated with defining business application requirements. Steps 550-570 may be associated with defining business application architecture. In any case, a user may define an element in each step by entering information into threat modeling interface 140 of FIG. 1. Though each step of the flowchart of FIG. 5 may be associated with a category and is listed in a particular order, the steps may be performed in any order.

The flowchart of FIG. 5 begins with defining business objectives at step 510. In one embodiment, defining a business objective identifies a goal of the threat modeling to be performed. This step is optional as indicated by the dashed lines comprising step 510. When the business objective is received, application 120 may store the business objective in threat model file 150. An example will be referred to for each step of the method of FIG. 5. For step 510, an example of a business objective may be, "increase usability of process."

User roles are defined at step 520. A role defines the trust levels of a business application and is used to make authorization decisions. Any user who interacts with a business application can be assigned a role. For example, user roles of "user" and "administrator" may be defined at step 520.

After user roles are defined, data used by the business application is defined at step 530. The defined data and roles are used later in the process to define the actual use cases. The used data may include information maintained and/or processed by the business application. In some embodiments, a data type can include a logical set of data objects. The logical set can then be classified. For example, a data types may include "credit card information" and "user information." Credit card information data type may include data elements such as first name, middle initial, last name, billing address, credit card number and credit card expiration date.

Data types may be classified into one of several groups to define the impact the data has in the application. Examples of data type classifications include high impact, medium impact and low impact data. At step 530, a user may specify a data type, data elements within the data type, and a classification for the data type. In some embodiments, other types of classification may be used as well. For example, a user may extend the list of classifications and add additional classifications. This is achieved through editing of an AppLists.xml file, which is accessible to the threat modeling tool.

In some embodiments, when defining data used within a business application, a user may also define an access control list for that data. The access control list indicates who may access the data type. An example of an access control list for "credit card information" is shown in FIG. 8A. As shown, any user may create credit card information data. Creating new credit card information may include creating a new account. In addition to outlining access control per role, an access control list may also indicate a condition applied to an access. For example, in the table of FIG. 8A, members of a "users" role may read or update existing credit card data upon satisfying a condition that the user is the owner of the credit card record. The last line of the table of FIG. 8A indicates that members of the "administrator" role may create, read, update or delete data.

After data is defined, use cases are defined at step 540. A use case is an ordered sequence of actions performed by a business application to realize an affect on data. For example, a use case may be, "read product information," "update credit card records," or some other action. Within interface 140, a user may enter a use case title, a role which performs the action associated with the user (e.g., a CRUD action), and the data affected by the action. A CRUD action is any one or combination of four actions: create, read, update and delete data. Thus, a user may enter input indicating whether a role can create, read, update or delete data. In one embodiment, the role may be selected from a list of roles generated at step 520 (and/or step 550 below), and the data may be selected from a list of data types defined at step 530. Thus, when defining a use case, a user may specify a role which performs an action on a data type. In some embodiments, application 120 may automatically graph the relationships of a use case and display the graph for a user. In particular, threat modeling application 120 automatically generates a graph from a user defined sequence of calls for a use case. This may be helpful in visualizing relationships between the role and the data which are coupled together by an action. In some embodiments, a list of use cases which needs to be fulfilled can be automatically generated from a defined data access control matrix, discussed in more detail below.

Service roles are defined at step 550. A service role is similar to a user role, but is comprised of a trust level that contains an identity that defines context of various components running in the business application. Role-based models may involve components impersonating identities that belong to roles. The roles are then used to design authorization controls. A website or a database is an example of a component. Components contain an identity that defines context of various components running in or along with a business application. For example, a user role may send a request to a website to view their credit card account data. The account data may be stored in a database in communication with the website. The website can retrieve the user account data in response to the request. Thus, a "website role" can be created as a service role to perform this action on behalf of the website component.

After service roles are defined, components are defined at step 560. Components are building blocks of the business application. In some embodiments, components may be an instance of a technology type. Examples of components include a server, database, web service, websites, thick clients and other elements. For each component, a user may specify several attributes. First, a user may configure roles that may interact with the component. A user may then specify data which is persisted within a particular component, if applicable.

Defining business application components may include defining attributes that are relevant to the component. These relevant attributes are called "relevancies." In one embodiment, users may select from a pre-populated list of relevancies to associate with a component. The pre-populated relevancies can be provided by an attack library. These relevancies can be used to associate elements of a modeled business application to particular threats. In particular, relevancies are used to bind components to a specific attack. In some embodiments, the relevancies may be identified with an identifier, but include a description. Examples of the component relevancy descriptions may include "component accepts authentication using interactively entered credentials," "component utilizes unmanaged code," "component exposes a web-based browser interface," and "component utilizes cryptography."

In some cases components may be decomposed further into objects. For example, objects may have parent-child relationships (such as a web site with many web pages, or a database with several data tables or views). In some embodiments, each child may also have children elements. When components may be further decomposed into objects, each child or grandchild of the component may be defined as a component itself.

Next, external dependencies may be defined in step 565. This step is optional, as indicated by the dashed line comprising step 565 in the process of FIG. 5. External dependencies are similar to components associated with service roles, but are external to the business application. External dependencies are required by the business application being developed but exist as a component which a system designer has no or little control over. For example, an e-commerce application that does credit card processing has an external dependency such as a bank application that performs the credit card processing.

Calls are defined at step 570. A call involves a "caller" acting on a "component" to implement a portion of a "use case." Each use case defined above at step 540 includes a sequence of calls. Put another way, a call may have a structure of a consumer coupled to a provider. A consumer may be a role or a component while a provider may be a component.

In some embodiments, there may be several rules or guidelines implemented by a business application to structure calls. The rules may be defined through a call user interface. The threat modeling application may enforce these rules through the call user interface as well. In some cases, roles and components can interact with components through defined actions. Data may be stored inside components, and components may create, read, update or delete data. Data can flow between two interacting components and between an interacting role and component.

Defining a call may involve several steps. The steps can be implemented through interface 140 or in some other manner. First, a user may identify a caller. A caller may be identified as either a role or a component. A user may then identify an action to be taken by the caller. The action may be identified by typing in a short description of the action. Next, a user identifies a component which is affected by the action of the caller. A user may then identify data sent and/or data received by the call, if either is applicable. A user then indicates the data affect of the call. The net data affect may be expressed in several ways. In one embodiment, the net data affect may be a CRUD action.

FIG. 8B illustrates three examples of defined calls associated with creating credit card information. The first call is a user creating credit card information from a website. In the first call, the consumer is the role "users," the action is "creating credit card information" and the provider or affected component is the "website". The data sent is credit card information. Similarly, call two is an administrator creating credit card information at the website. The third call is a website saving credit card information to a database.

Figure 6:
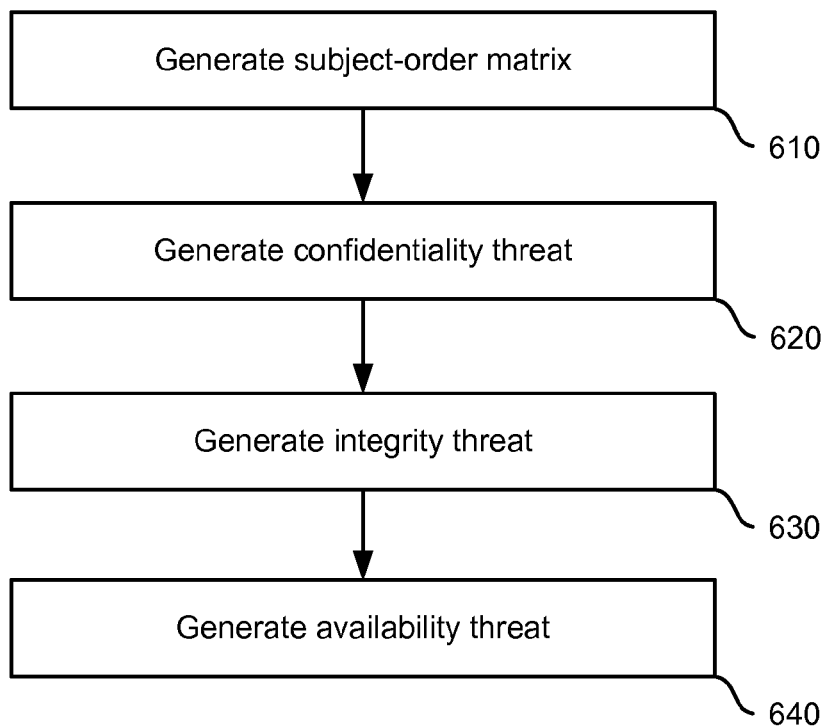
FIG. 6 is a flowchart of an embodiment of a process for modeling threats for a business application.

FIG. 6 is a flowchart of an embodiment of a process for modeling threats for a business application. In one embodiment, FIG. 6 provides more detail for step 420 of FIG. 4. The flowchart of FIG. 6 may be performed upon receiving input to "generate threats" into interface 140 or some other input mechanism of threat modeling application 120. In response to receiving input to generate threats, steps 610-640 of the flowchart of FIG. 6 are performed automatically. In particular, application 120 accesses attack library 130, defines potential attacks, and proposes effective countermeasures to the potential attacks.

First, in response to receiving input to generate threats, threat modeling application 120 generates a subject-object matrix at step 610. In one embodiment, a subject order matrix is generated by converting a list of calls into a matrix by threat modeling application 120. The matrix may be generated from the calls defined at step 570 of the flowchart of FIG. 5. A subject-object matrix is a two dimensional matrix of roles versus components. The matrix represents the subjects (roles) across a column heading and the objects (components) down the row headings. An intersecting cell in this matrix represents a list of allowable actions, if any, for the given subject on the given object. Put another way, each action defined in each cell in the subject-object matrix having data is associated with a call.

An example of a subject-object matrix for the credit card calls of FIG. 8B is illustrated in FIG. 8C. The matrix of FIG. 8C includes three columns and two rows of matrix data. The data columns are associated with roles of users, administrators and website. The data rows are associated with the components of website and database. The first row of data identifies actions performed on a "website" component by the particular role. In particular, the first data row indicates that a user may call an action of "create credit card information" on a website component, an admin may also call an action of "create credit card information" on a website component, and a website role may not call an action on a website component. The second data row in the matrix is associated with actions called on a database. In particular, the second data row indicates that neither a user or admin may not call an action on a database, but a website role may call a "save credit card information" action to a database.

Threats are generated for the defined business application in steps 620-640. Steps 620-640 are performed for each action entry in the subject-object matrix generated at step 610. Calls are used to derive a subject-object matrix. Threats are then generated for each given action in the subject-object matrix. Thus, one or more threats are generated for each call in a use case. In one embodiment, threat modeling application 120 generates threats using component data entered by a user and attack library 130. As disclosed above, each user defined component may have a relevancy attribute. The relevancy attribute is entered by a user as discussed above when defining a component. When generating threats, each component is loaded into memory by threat modeling application 120 and the component relevancies are read. Next, the attack library is accessed. Once the attack library is accessed, application 120 identifies attacks associated with a relevancy that match a relevancy associated with a user defined component in the application. For each attack associated with a relevancy which matches a component relevancy attribute, countermeasures associated with threats are provided. Thus, the attack library provides context behind the generated threat to help define potential countermeasures. Roles, actions and other attributes of the relevant component may be provided as attributes to the one or more generated attacks for that component. This is discussed in more detail below.

First, confidentiality threats are generated at step 620. In one embodiment, confidentiality threats may be associated with an unauthorized disclosure of an action using a component by a role. Thus, a threat is generated for each action in a subject-object matrix. A threat may be generated for each combination of action and roles associated with the component. For example, if a component was associated with two roles and two data types, four integrity threats could be generated for the component.

In some embodiments, each generated threat of steps 620-640 may be associated with one or more primary threat factors. The primary threat factors are provided as an aid for the threat analysis and help determine the impact level of the threat in the context of the business objectives. Primary threat factors exists as options behind each confidentiality, integrity and availability threat in an effort to help contextual those threats a little better to the business application. In the case of a confidentiality threat, the primary threat factors may include "unauthorized disclosure of an identity" and "unauthorized disclosure of data." Threat modeling application 120 will generate primary threats of "unauthorized disclosure" of each role and "unauthorized disclosure" of each data type associated with the corresponding component.

An integrity threat may be generated at step 630. An integrity threat may involve an illegal execution of an action using a component by a role. Thus, a threat is generated for each action and role or for each action in a subject-object matrix. Unlike the confidentiality threats related to disclosure of an action, the integrity threats are associated with execution of an action.

Primary threat factors for generated integrity threats may include "violation of access control" and "violation of data integrity." For access control threats, threat modeling application 120 would generate a threat associated with violation of each access control for data associated with the component. Access controls for users of a component may be maintained by threat modeling application 120, for example in a table such as the table of FIG. 8A.

Next, an availability threat may be generated at step 640. An availability threat may involve an ineffective execution of an action using a component by a role. Primary threat factors associated with an availability threat may include "unavailability of an action" and "performance degradation of the action." In this case, an unavailability threat may not necessarily be realized through an attacker, but rather by a failure or design issue in the system itself. In some embodiments, an availability threat may be associated with a conditional requirement. For example, an e-commerce site taking longer than five seconds to response to a request may be considered if a threat if it may result in a loss of potential business. In this case, the threat model needs to explicitly define any condition or requirement in any form. For example, a performance requirement for the e-commerce site may be that all responses must be provided in less than 2 seconds.

Figure 7A:
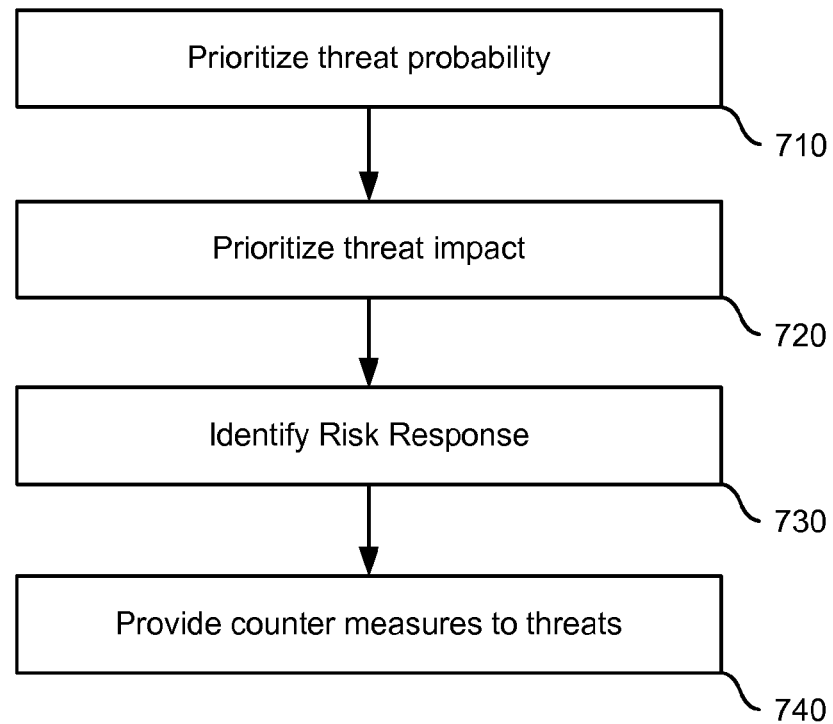
FIG. 7A is a flowchart of an embodiment of a process for measuring risk for a business application.

In some embodiments, threats may be measured before countermeasures are provided to a user. Measuring the risk for a business application threat allows a user to quantify the impact of a threat. FIG. 7A is a flowchart of an embodiment of a process for measuring risk for a business application threat. In one embodiment, the flowchart of FIG. 7 provides more detail for step 430 of FIG. 4. First, threat probability is prioritized by a user at step 710. In one embodiment, a user may identify the probability that each identified threat will occur. This may be performed by a user selecting a numerical value associated with the threat, selecting one of a number of present threat values (e.g., one of high, medium, low), or some other risk measurement mechanism. Thus, on a scale of one to ten, if a threat is very probable to occur, the user may assign a value of ten. In some embodiments, a user may define their own risk measurement plug-in and then measure risk based on any formula (quantitative or qualitative) the user desires. If a threat is very unlikely to occur, the user may associate a value of one. Next, a user may associate a threat impact value to a particular threat. If the impact of an attack associated with a threat is highly undesirable, a user may assign a high impact value to the threat. If the impact of a threat would be low, a user may assign a low value to the threat impact.

In some embodiments, after prioritizing threat probability and impact for each threat, threat modeling application 120 may generate a value of the risk for the particular threat. In one embodiment, the risk may be considered the product of the threat probability and threat impact values.

Next, a user may identify a risk response for each identified threat. A risk response may indicate a response to the level of risk associated with each threat. In one embodiment, a user may select one of several responses to a risk through threat modeling interface 140. The user selected response may be a selection of a pre-populated list or some other input. For example, one risk response may be to "accept" the risk. In this case, the user determines that nothing needs to be done regarding the identified risk. Another response may be to "avoid" a risk. In this case, the related components and features associated with this risk are to be removed or otherwise disabled. A risk response of "reduce" may indicate that countermeasures are to be applied to either lower the impact or probability of the risk. Additionally, a risk response may indicate that a risk should be "transferred." In this case, a risk may be transferred to an external dependency or some other system.

Figure 7B:
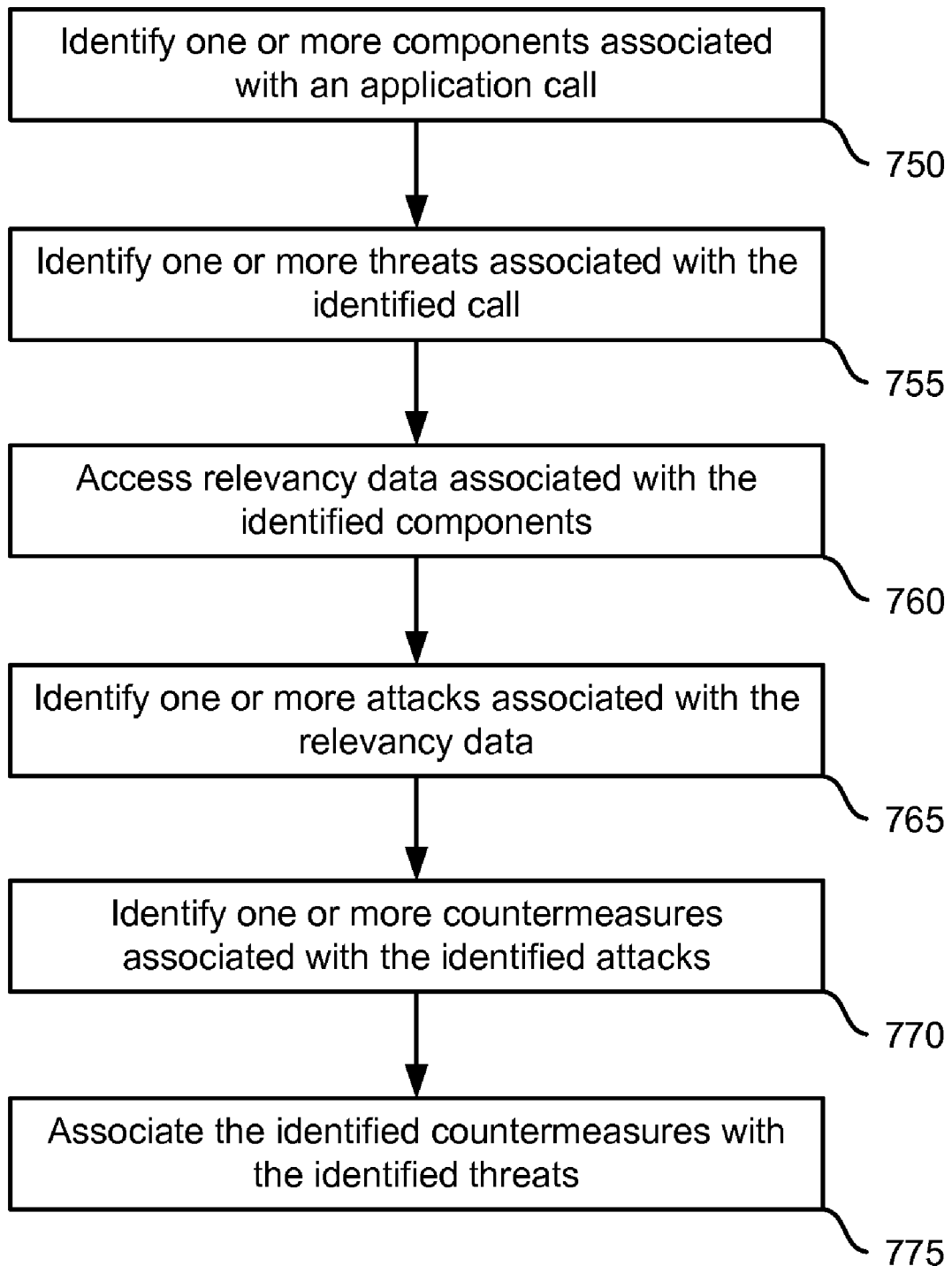
FIG. 7B is a flowchart of an embodiment of a process for providing countermeasures to threats.

After identifying risk responses, countermeasures may be provided to threats at step 740. In some embodiments, if the attack library is present, and relevancies are associated with components that are used to define calls, the generated threats will have countermeasures associated with them. In one embodiment, countermeasures are contained in the data structure for an attack within an attack library. The countermeasures are associated with threats through the attack library and relationships of a component to attacks and threats. Providing countermeasures for threats is discussed in more detail below with respect to FIG. 7B FIG. 7B is a flow chart of an embodiment of a process for providing countermeasures for threats. In one embodiment, the flowchart of FIG. 7B provides more detail for step 740 of FIG. 7A. First, one or more components associated with a business application call are identified at step 750. In one embodiment, each call in the subject-object matrix is translated into one or more actions which are captured in the matrix cells. Threats are generated for action in a subject-object matrix. For a particular threat, the component of the corresponding application call is accessed. Next, one or more threats associated with the identified call are identified at step 755. This is performed and discussed above with respect to steps 620-640 of FIG. 6.

Relevancy data associated with the identified components is accessed at step 760. In one embodiment, the components identified in step 750 have relevancy data as a result of the business application definition process. Next, attacks associated with the relevancy data are identified at step 765. The attacks may be identified from the attack library, which associates attack types with relevancy data.

Figure 9:
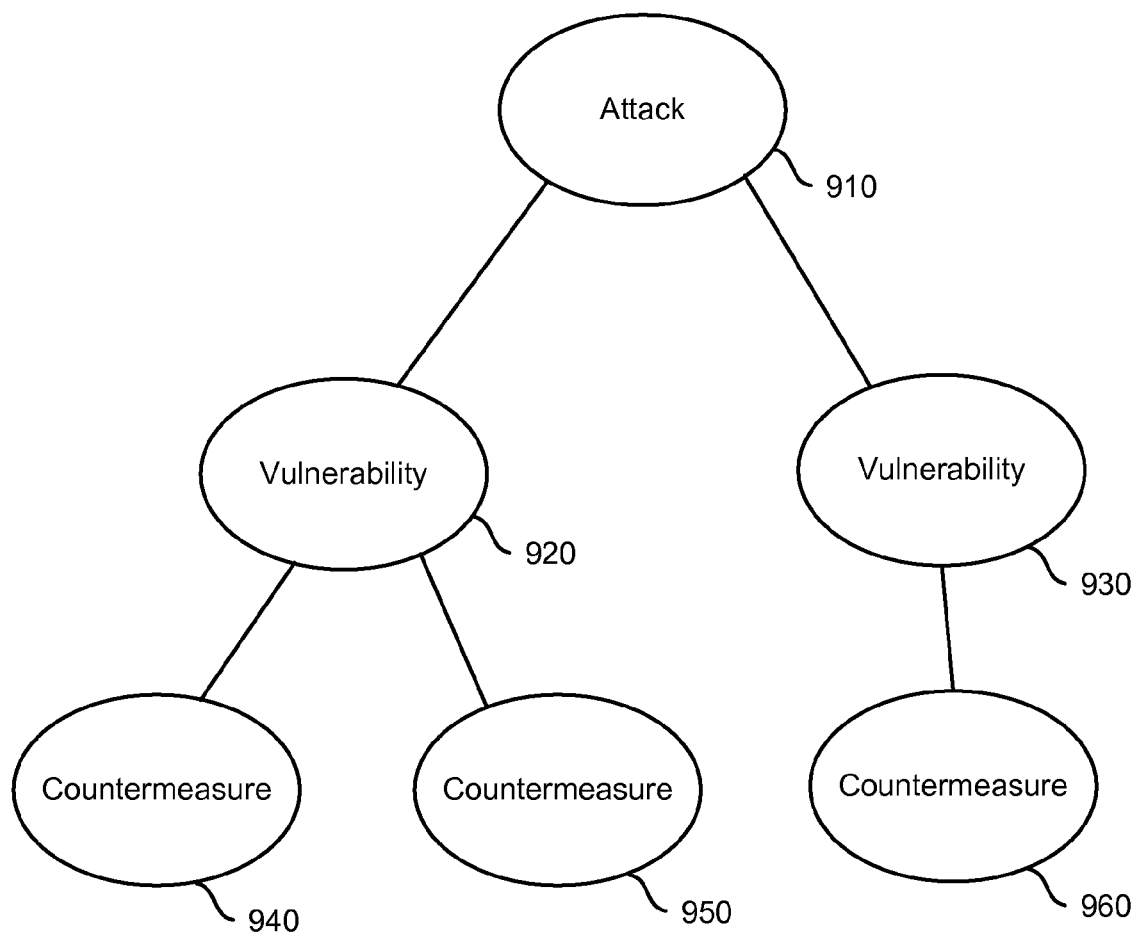
FIG. 9 is a block diagram of an example of an attack-countermeasure relationship described within an attack library.

Countermeasures associated with the identified attacks are identified at step 770. In one embodiment, attack library 130 maintains an association between attacks and countermeasures. FIG. 9 is a block diagram of an example of an attack-countermeasure relationship within attack library 130. As illustrated, each attack may be associated with one or more vulnerabilities. A vulnerability may be associated with one or more countermeasures. Thus, each attack is associated with one or more countermeasures.

As illustrated in FIG. 9, an attack library may indicate two or more countermeasures are available for one vulnerability and/or attack. In some embodiments, attack libraries may implement one of the countermeasures as a core countermeasure for a particular vulnerability. The core countermeasure may be considered the best countermeasures for the particular vulnerability. In this case, a user or administrator of the attack library may designate one of the two or more available countermeasures as a core or preferred countermeasure. The attack library may then identify the core countermeasure as the countermeasure associated with the particular vulnerability at step 770.

Identified countermeasures are associated with the identified threats at step 775. In particular, the countermeasures identified in step 770 are associated with the threats identified at step 775. For each threat, associated countermeasures may be provided to a user through threat modeling interface 140. As discussed above, countermeasures may be provided to a user for threats that a user wishes to reduce. In some embodiments, countermeasures for additional threats may be provided as well.

Figure 10:
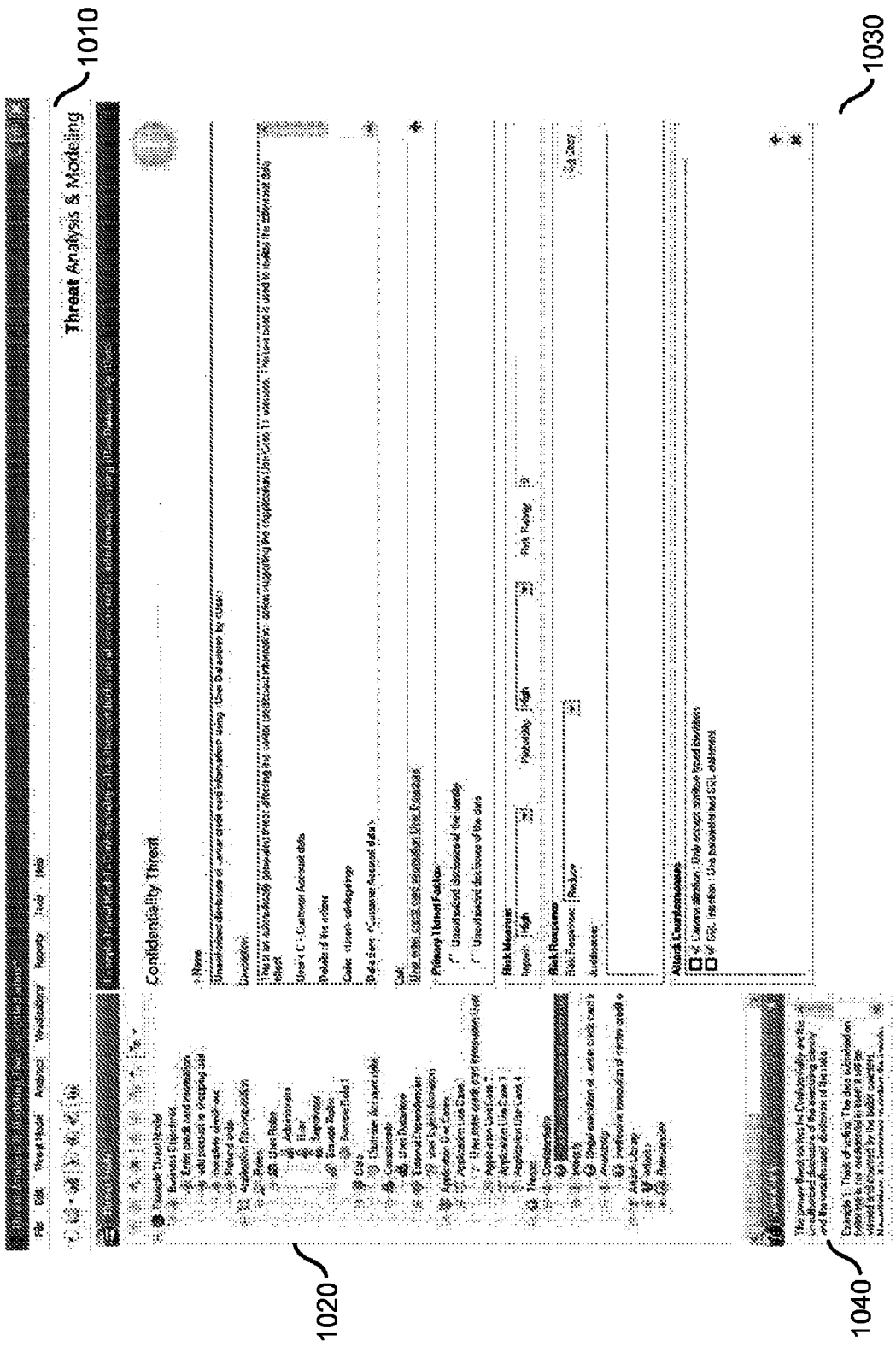
FIG. 10 is an example of a threat modeling interface.

FIG. 10 is an example of a threat modeling interface. Threat modeling interface includes toolbar 1010, node window 1020, field window 1030 and help window 1040. Toolbar 1010 includes drop-down menus and buttons which allow a user to manipulate the interface and create a threat model. The drop down menus allow a user to edit a portion of a threat model, view subject-object matrices and other relevant data tables, generate reports for a generated threat model and other actions. Toolbar buttons may be selected by a user and perform functions such as create new threat model, save a threat model, view a report, and other functions.

Node window 1020 provides a node view of the elements of a current threat model. Examples of nodes that may be included within a threat model include business objectives, roles, data, components, external dependencies, use cases, calls, threats, attack libraries and relevancies. In one embodiment, the nodes are provided in a hierarchical format which matches the XML format of threat model file 150. Field window 1030 provides fields in which a user may enter input. For example, field window 1030 may provide text boxes for a user to enter information for a selected node. As illustrated in FIG. 10, the current selected node is "threats associated with confidentiality." Field window 1030 illustrates data for the particular confidentiality threat, boxes the user may select to view particular threat factors, and drop down menus to identify risk measure impact and probability. The data in field window 1030 for the confidentiality threat includes name, description, call, primary threat factors, risk measure, risk response, and attack countermeasures. Help window 1040 is optional, and may provide helpful information for a selected node.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A method for generating a threat model for a software application, comprising:

receiving application modeling data in a user interface, the application modeling data defines a software application that includes components and one or more calls, a call identifies a caller, first data affected by the call, an action taken by the caller with respect to the first data, and at least one of the components affected by the action of the caller;

providing, in the user interface, a list of pre-defined attributes that are relevant to threats;

receiving a selection of at least one of the pre-defined attributes, the selection associating the selected pre-defined attribute with a first component of the components;

determining allowable actions based on the definitions of the calls in the application modeling data;

automatically generating threat information based on the application modeling data, the allowed actions, the selected at least one pre-defined attribute, and an attack library, the attack library includes attacks that are associated with the pre-defined attributes, the automatically generating threat information includes identifying attacks in the attack library that are associated with the selected pre-defined attribute; and providing, in the user interface, countermeasures associated with the threat information.

2. The method of claim 1, wherein said step of providing countermeasures includes:

identifying one or more of the components associated with a first of the calls; and identifying one or more threats associated with the identified components.

3. The method of claim 2, wherein said step of providing countermeasures includes:

identifying one or more countermeasures associated with a first of the attacks that are associated with the selected pre-defined attribute; and associating the identified one or more countermeasures with the one or more threats.

4. The method of claim 1, further comprising:

generating reports associated with a threat model by a threat modeling application.

5. The method of claim 1, further comprising:

saving threat model data to a threat model file.

6. The method of claim 1, further comprising determining un-allowable actions based on the allowable actions, wherein the determining un-allowable actions includes:

determining an unauthorized disclosure that is a variation of one of the allowed actions.

7. The method of claim 1, further comprising determining un-allowable actions based on the allowable actions, wherein the determining un-allowable actions includes:

determining an illegal execution that is a variation of one of the allowed actions.

8. The method of claim 1, further comprising determining un-allowable actions based on the allowable actions, wherein the determining un-allowable actions includes:

determining an ineffective execution that is a variation of one of the allowed actions.

9. One or more processor readable storage devices having processor readable code embodied on said processor readable storage devices, said processor readable code for programming one or more processors to perform a method comprising:

receiving application modeling data in a user interface, the application modeling data defines a business application including one or more business application components, and one or more use cases, a use case includes a list of business application calls, a business application call in a given one of the use cases identifies a caller, first data affected by the call, an action taken by the caller with respect to the first data, and at least one of the components affected by the action of the caller;

converting, by a threat modeling application, the list of business application calls for each use case into allowed actions of the callers with respect to the first data and the components for the use case;

automatically generating threat information derived from the allowed actions of the callers and an attack library, the automatically generating threat information includes generating one or more threats for each call in each use case; and generating a threat model associated with the business application.

10. One or more processor readable storage devices according to claim 9, wherein said step of generating a threat model includes:

receiving input associated with prioritizing a generated threat.

11. One or more processor readable storage devices according to claim 10, wherein said step of prioritizing includes:

prioritizing the impact or probability associated with the generated threat.

12. One or more processor readable storage devices according to claim 9, wherein said step of generating a threat model includes:

determining that a risk associated with a selected threat should be reduced; and providing countermeasures to the selected threat.

13. One or more processor readable storage devices according to claim 9, further comprising:

determining un-allowable actions based on the allowed actions, wherein the determining un-allowable actions includes determining an unauthorized disclosure that is a variation of one of the allowed actions.

14. One or more processor readable storage devices according to claim 9, further comprising:

determining un-allowable actions based on the allowed actions, wherein the determining un-allowable actions includes determining an illegal execution that is a variation of one of the allowed actions.

15. One or more processor readable storage devices according to claim 9, further comprising:

determining un-allowable actions based on the allowed actions, wherein the determining un-allowable actions includes determining an ineffective execution that is a variation of one of the allowed actions.

16. An apparatus for processing data, comprising:

a communication interface;

a storage device; and one or more processors in communication with said storage device and said communication interface, said one or more processors perform a method comprising, comparing application modeling data to an attack library, the application modeling data defines a business application, the definition including one or more business application components, one or more use cases, a use case includes a list of business application calls, a business application call in a given one of the use cases identifies a caller, first data affected by the call, an action taken by the caller with respect to the first data, and at least one of the components affected by the action of the caller, the comparing includes determining allowable actions based on the definitions of the business application calls in each of the use cases;

automatically identifying attacks and threats associated with the business application based on said step of comparing, the automatically identifying attacks and threats includes determining unallowable actions based on the allowable actions, and generating a threat model associated with the business application, the threat model incorporating the attacks and threats.

17. The apparatus of claim 16, wherein said step of comparing includes:
identifying attacks in the attack library having an attribute value that matches a corresponding attribute value in a portion of the application data.

18. The apparatus of claim 16, wherein said step of generating a threat model includes:

identifying one or more countermeasures associated with an attack; and associating the countermeasures with the identified threats.

19. The apparatus of claim 16, further comprising:
providing an interface for viewing the threat model.

20. The apparatus of claim 16, further comprising receiving the application modeling data in a user interface.

* * * * *